(12) United States Patent
Carlsson et al.

(10) Patent No.: US 7,847,721 B1
(45) Date of Patent: Dec. 7, 2010

(54) DECOY FOR DECEIVING RADAR SYSTEMS, ESPECIALLY DOPPLER RADAR SYSTEMS

(75) Inventors: Conny Carlsson, Skepplanda (SE); Björn Jägerström, Kullavik (SE)

(73) Assignee: Forsvarets Materielverk, Stockholm (SE)

( * ) Notice: Subject to any disclaimer, the term of this patent is extended or adjusted under 35 U.S.C. 154(b) by 1826 days.

(21) Appl. No.: 08/806,763

(22) Filed: Mar. 24, 1997

(30) Foreign Application Priority Data

Mar. 20, 1996 (SE) .................................... 9601063

(51) Int. Cl.
*H01Q 17/00* (2006.01)

(52) U.S. Cl. .................. 342/6; 342/7; 342/8; 342/9; 342/10

(58) Field of Classification Search .............. 342/6, 342/7, 8, 9, 10
See application file for complete search history.

(56) References Cited

U.S. PATENT DOCUMENTS

| | | | |
|---|---|---|---|
| 2,463,517 A | 3/1949 | Chromak | 343/18 |
| 3,308,464 A | 3/1967 | Lewis | 343/18 |
| 3,918,060 A * | 11/1975 | Alpers | 342/97 |
| 3,958,246 A * | 5/1976 | Wohlers et al. | 342/6 X |
| 4,314,249 A * | 2/1982 | Onoe | 342/6 |
| 4,647,930 A * | 3/1987 | Carof et al. | 342/6 |
| 4,843,396 A | 6/1989 | Macikunas et al. | 342/7 |
| 4,980,688 A * | 12/1990 | Dozier, Jr. | 342/9 |
| 5,317,163 A | 5/1994 | Obkircher | 250/495.1 |
| 5,319,373 A * | 6/1994 | Maxwell et al. | 342/55 |
| 5,680,136 A * | 10/1997 | Chekroun | 342/6 |

FOREIGN PATENT DOCUMENTS

| | | |
|---|---|---|
| DE | 42 02 753 | 8/1993 |
| GB | 2423872 A * | 9/2006 |
| WO | WO 2007136308 A1 * | 11/2007 |

* cited by examiner

*Primary Examiner*—John B Sotomayor
(74) *Attorney, Agent, or Firm*—Jacobson Holman PLLC

(57) ABSTRACT

The present invention relates to a decoy for deceiving radar systems, especially Doppler radar systems. The decoy comprises a corner reflector, where at least one of the surfaces (1) is arranged to be able to obtain a varying reflectivity for radar radiation, especially with a modulation frequency which in the reflected radiation causes Doppler sidebands of an extent that is usual for the radar application.

8 Claims, 2 Drawing Sheets

DECOY FOR DECEIVING RADAR SYSTEMS, ESPECIALLY DOPPLER RADAR SYSTEMS

The present invention relates to a decoy for deceiving radar systems, especially Doppler radar systems.

DESCRIPTION OF RELATED ART

Decoys in all forms have constituted and still constitute an important component for deceiving the many sensor systems of war, anything from the eyes of the individual soldier to the ground or air-borne radar system.

Great efforts have been devoted especially to decoys for deceiving radar systems since the object to be protected, in many cases an aircraft, is of considerable military value. Chaff (bundles of strips) has previously been used as decoy for deceiving radar. If the metallised strips are of a length which is suitably adapted to the radar frequency of the radar that is to be misled, a strong resonance is obtained. The strips that are dispersed from aircraft in bundles then cause echoes that can mislead the radar or conceal the aircraft.

The introduction of pulsed Doppler radar dramatically reduced the capability of chaff to influence the radar. A pulsed Doppler radar uses the Doppler effect (phase variation from pulse to pulse in the radar echo) to distinguish reflecting objects moving fast in relation to the radar station and stationary objects. As a result, ground clutter and also chaff that is almost immobile in relation to the ground can be rejected. The use of Doppler radar systems for rejecting ground echoes therefore renders the capability of the bundle of strips of effective misleading impossible.

Other passive methods for confusing radar use reflectors of different kinds, for instance corner reflectors or Luneburger lenses to produce powerful echoes from small objects. To produce the necessary Doppler frequency that permits detection in a Doppler radar, these must then be hauled or accommodated in small decoy aircraft which can separate from the object to be protected. This requires aerodynamically well designed units and, moreover, in many cases restrictions in the flight appearance.

Modern decoy solutions often consist of active jamming transmitters which are launched from the aircraft or hauled thereby. A pure amplification and transmission of the radar pulse cannot be carried out with isotropic transmitting and receiving antennae owing to insufficient insulation (results in so-called feedback). Other active solutions using, for example, microwave memory and delayed transmission result in distortion of the pulse shape. Narrow band jamming as well as wide band jamming are known. Equipment for jamming by narrow band noise is sensitive to a frequency change of the radar and requires equipment for searching over the frequency band for the new frequency. Wide band noise requires high power output. All in all, active decoys will necessarily be relatively expensive and complicated equipment.

SUMMARY OF THE INVENTION

The present new passive decoy solution eliminates all the restrictions that are connected with traditional passive and active decoys. Such a decoy in the form of a modulated corner reflector has a combination of properties which is new in the context and which comprises:
  Not filterable in a Doppler radar system,
  reflects any wave form correctly,
  isotropic radiation diagram,
  low power consumption (almost passive)
  size and price at a level allowing launching of showers (5-10 pieces) at a time (may be regarded as a modern form of Doppler chaff).

These decoys should be usable in different contexts, for instance:
  Launching of decoys for misleading enemy radar missiles, air-borne or ground fire-control radar,
  mass-launching of decoys for masking flight operations against air-borne or ground reconnaissance radar,
  placing of decoys on the ground for activation in and thus masking of low altitude flying operations in prepared corridors,
  placing of decoys on the ground close to objects to be protected to render discovery of these objects by using high-resolution mapping radar impossible.

The desired properties are achieved in the invention by designing a corner reflector where at least one of the surfaces is adapted to be able to obtain a varying reflectivity for radar radiation, especially with a modulation frequency which in the reflected radiation causes Doppler sidebands of an extent that is usual for the radar application. Suitable embodiments of the invention are defined in the claims.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
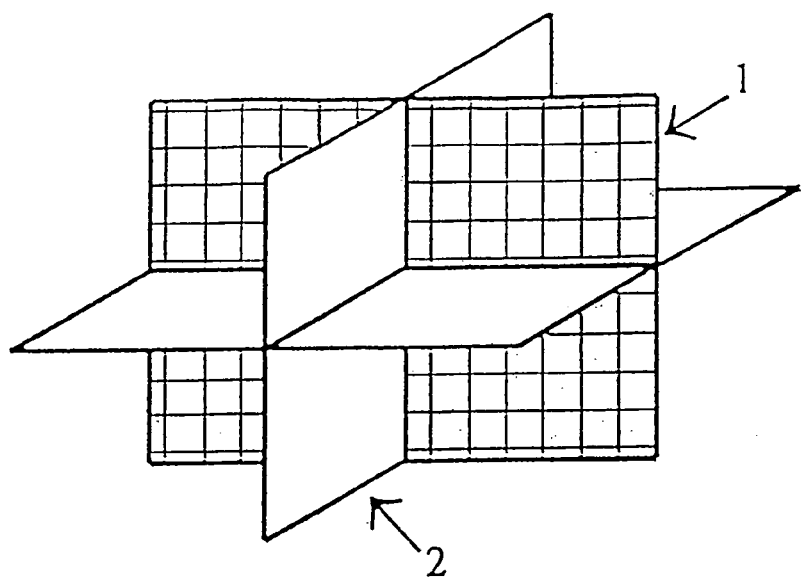
FIG. 1 illustrates a corner reflector where one of the three surface planes constitutes a modulatable plane of reflection.

The decoy consists of a radar-cross-section-modulated corner reflector according to FIG. 1, where two surfaces 2 are metallised and thus fully reflective. The reflection of the third surface 1 may be varied, which implies that the total decoy surface is modulated. The radar-cross-section-modulation will be seen in all directions of incidence except in parallel incidence with the modulated surface.

Such a radar-cross-section-modulation involves an amplitude modulation of the pulse train of the radar, which generates symmetric Doppler sidebands on both sides of the base frequency. The base frequency is the Doppler-shifted radar frequency. The sidebands are separated with modulation frequency. After launching, the decoy will quickly assume wind velocity, and therefore the Doppler frequency will be low compared with aircraft. Since the modulation is carried out as a square wave variation, this implies for all pulsed Doppler radar systems (LPD, MPD and HPD systems) that a plurality of modulation tones, above as well as below ground returns, are to be found in the passband active for the radar. Besides, if the modulation frequency is varied (swept), said tones will migrate in a natural fashion in the field of analysis of the radar.

A launching situation which is suitable for an aircraft is when turning through the O-Doppler (transverse course relative to lobe direction), since a Doppler radar will then be forced to reject also the target, and the probability of relocking on the decoy is great. By sweeping the modulation frequency, also the probability of penetrating a narrow Doppler filter of the homing type for semiactive radar missile increases. Besides, the possibility of analysing and rejection of the decoy based on the measured frequency will be prevented. Therefore, the modulation frequency should suitably be swept in the typical Doppler area close to the 90-degrees-sector position, for instance from 0 to 9 kHz on X-band. The sweeping velocity should correspond to a typical aircraft operation seen in Doppler frequency, for instance 3 kHz/s on X-band.

A further convenient launching procedure involves the increasing of the distance uncertainty of the radar by active noise, whereupon the noise jamming is interrupted at the time of launching, and the radar locks on the decoy.

In contrast to many other repeater jamming systems, reflection against the decoy takes place without the pulse form and the wave form otherwise changing. This implies that radar systems having different wave form techniques (for instance, different pulse compression techniques) will receive echo returns which conform with the returns from physical targets. Thus, such echo returns cannot be readily distinguished as false ones.

Figure 2:
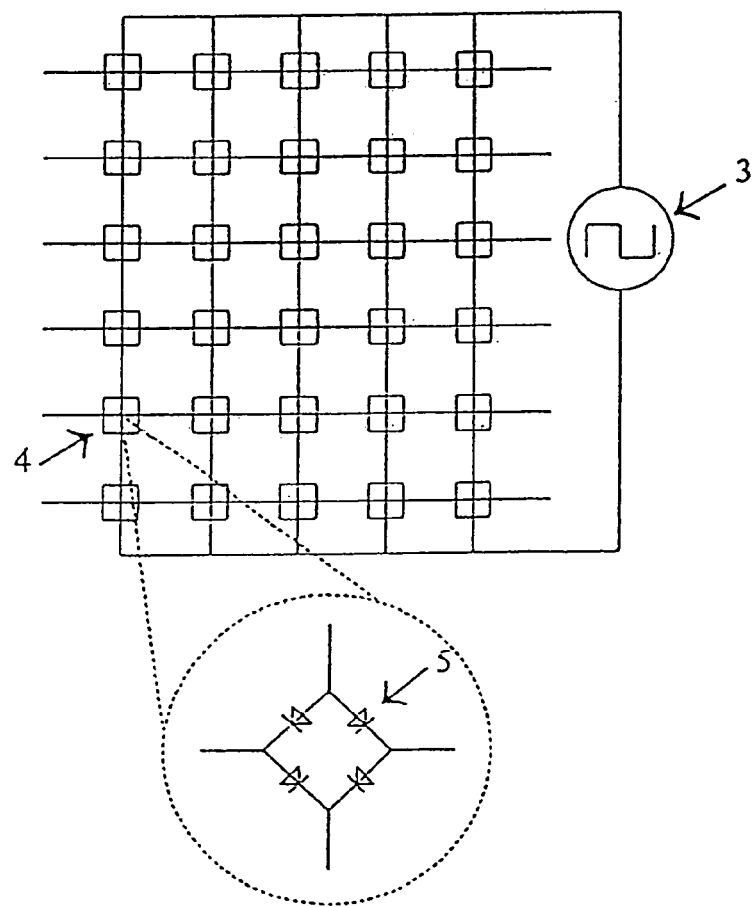
FIG. 2 shows the composition of the modulatable plane of reflection in the form of a wire structure which in the crossing points is connected by a diode structure.

The controllable surface may consist of lines in a check pattern according to FIG. 2, where each cross 4 in the check pattern is connected by a switching element. The switching element may consist of a diode bridge 5. The diodes can be PIN diodes. When the surface is supplied with a square wave voltage 3 with modulation frequency, the line pattern will be interconnected and the surface reflective in forward voltage. In reverse voltage, the line pattern will be broken and the surface assumes a significantly lower reflection coefficient.

The diode bridge 5 according to FIG. 2 may consist of four diodes, where the diodes are arranged such that, in forward voltage, current is conducted from the upper arm into the three other arms. In this position, both vertical and horizontal lines will thus be conducting and the surface as such will be strongly reflecting. In reverse voltage, all diodes, however, will be operated in reverse voltage and no current flows in the line pattern. The surface will assume a pattern of dipoles which, if they are shorter than half a wavelength of the incident radar frequency, give the surface its low reflection. It should be noted that this special diode constellation means that the entire surface can be operated by a very simple feeding network that does not interfere with the conductor network for radar-cross-section-modulation.

The decoy can be optimised for various frequency ranges. The following dimensioning can be suitable for X-band:

Distance between switching elements 7-10 mm,
controllable surface 30*30 cm,
number of switching elements 900,
power consumption <1,5 W.

This results in a decoy surface corresponding to about 10 m$^2$.

Figure 3:
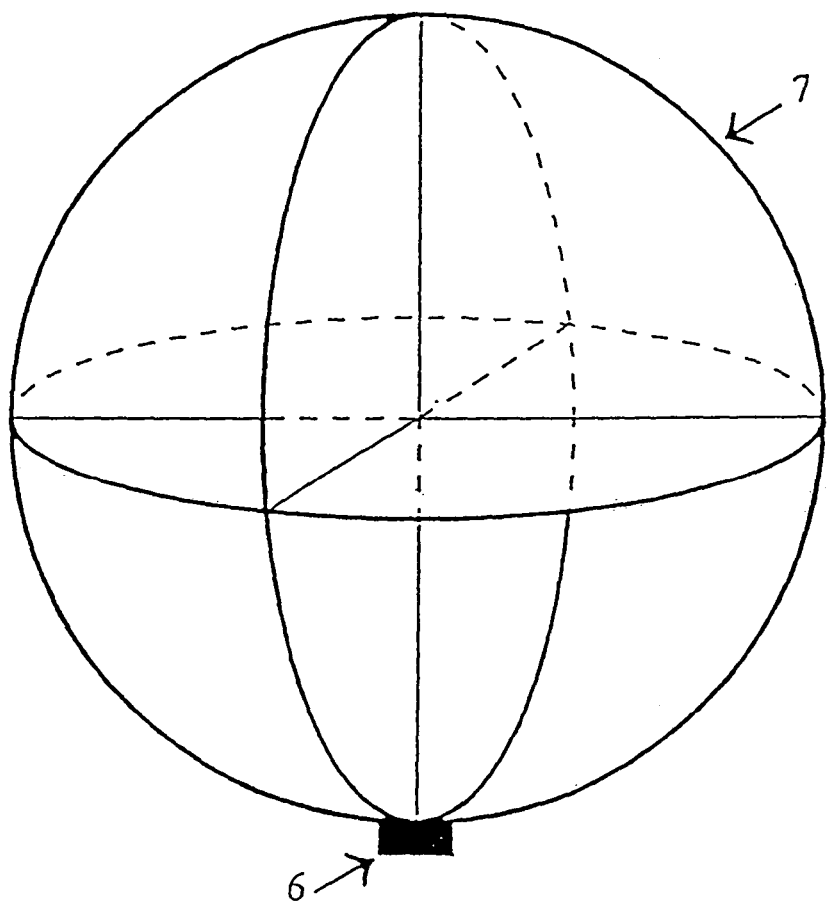
FIG. 3 shows an activated decoy for air-borne application with protective casing and box for support electronics and battery.

Decoys of the type that is intended to be launched from aircraft should be chargeable in spaces for standard-type launchers. For this reason, both the two conductive surfaces and the modulating surface can be made of a flexible, foldable material, e.g. a foil-prepared fabric or a line-etched flexible dielectric. To the latter, the diode bridges have been applied by automatic soldering. The surfaces and the support electronics with battery are packed in a box of the size 100-200 cm$^3$. In the launching moment, a gas cartridge is activated, which develops a protective casing 7 (balloon, cf. air bag) which in turn fixes the reflector planes according to FIG. 3. The support electronics and the battery 6 constitute a stabilising weight, such that the modulating surface 1 after stabilisation is vertical and thus minimises the risk of situations with radar reflection below a low modulation index. The gas cartridge can suitably contain some light inert gas, for example helium, which extends the time of function in the air.

The design of decoys for ground use can be made considerably simpler with rigid planes of reflection and a simple plastic cover as radome. The basic rules for interference action against Doppler radar follow the above description in all essentials.

Attack and reconnaissance systems which utilise the fact that different ground elements within the main lobe of the antenna get a varying Doppler frequency for Doppler beam sharpening can also be interfered with by-the proposed decoy. A random frequency control should then suitably be selected to interfere with the Doppler filtration of the radar. By arranging a number of decoys around ground objects which deserve protection, information on details may be concealed and, consequently, identification and combating can be rendered difficult.

What is claimed is:

1. A decoy for deceiving Doppler radar systems comprising:
    a corner reflector having a first and a second type of surface, where at least one of the surfaces is of the first type and the rest of the second type,
    said first type surface being non-reflecting and having a check pattern of electrical lines arranged so close together that when electrically interconnected at crossing points, the check pattern reflects incident radar radiation, and a switching element at each crossing point which electrically connects the lines to provide current flow through the lines when a voltage of a first direction is applied across the pattern of lines and make said first surface reflect radar radiation and which electrically disconnect the lines to prevent current flow through the lines when a voltage of an opposite direction is applied across the pattern of lines to make the first surface not reflect radar radiation,
    said second type of surface permanently reflecting radar radiation, and
    a means for applying voltage alternatingly in said first and said opposite direction across the pattern of lines with a modulation frequency to create Doppler sidebands in the reflected radiation of the decoy.

2. The decoy as claimed in claim 1, wherein the modulation frequency is variable.

3. The decoy as claimed in claim 2, wherein the modulation frequency is randomly variable.

4. The decoy as claimed in claim 1, wherein each switching element comprises four diodes in a diode bridge conducting current from one conductor to three other conductors, and the check pattern of lines is adapted to be supplied with a square wave voltage between the side from which direction the diode bridge conducts current and the opposite side of the check pattern of lines.

5. The decoy as claimed in claim 1, wherein all surfaces are made of a flexible, foldable material, and the decoy in the storage state is folded before being put into use.

6. The decoy as claimed in claim 5, wherein the surface of the second type comprises a reflecting foil and the surface of the first type comprises a line-etched dielectric, where the diode bridges are arranged in the crossing points of the lines.

7. The decoy as claimed in claim 5, wherein said decoy is enclosed by a flexible closed casing of a balloon type and provided with an inflation device, which in operation transforms said decoy from a storage state to a state of operation.

8. The decoy as claimed in claim 7, wherein the inflation device uses a light inert gas which gives an extended time of function in its action as an air-borne decoy.

* * * * *